3,164,583
DERIVATIVES OF 3-KETO STEROIDS
Laszlo Vargha, Marta Rados, and Laszlo Szporny, Budapest, Hungary, assignors to Richter Gedeon Vegyészeti Gyár Rt., Budapest, Hungary
No Drawing. Filed Apr. 4, 1963, Ser. No. 271,554
5 Claims. (Cl. 260—239.5)

This invention relates to new and useful basic derivatives of steroid compounds. More particularly it is concerned with novel derivatives of certain 3-keto-steroids substituted by a hydroxyl group in the 17α- and by a basic substituent in the 16-position.

It is known that various steroid componds, e.g. $\Delta^1$-dehydro-17α-methyltestosterone and nor-androstenolone phenylpropionate show therapeutically useful anabolic effects; it is, however, an important disadvantage of these known anabolic steroids that they exert simultaneously also undesirable hormonal (e.g. androgenic or estrogenic) side effects which impose important restrictions on their applicability.

It has surprisingly been found that the new 3-keto-$\Delta^4$-steroids of the Formula I

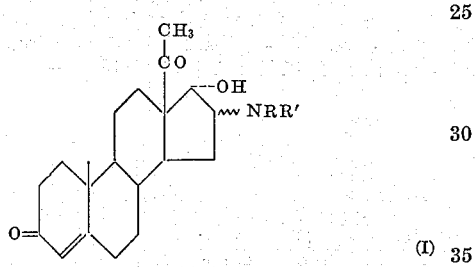

where NRR' stands for a member selected from the group consisting of dialkylamino, piperidino, piperazino, pyrrolidino and morpholino radicals, have a therapeutically valuable anabolic effect without having simultaneously the undesired hormonal (e.g. androgenic or estrogenic) side effects of the anabolic steroids known hitherto.

These new compounds can be prepared according to the present invention by reacting a 3-enol-ether of the 16,17-oxido-$\Delta^4$-pregnene-3,20-dione of the Formula II

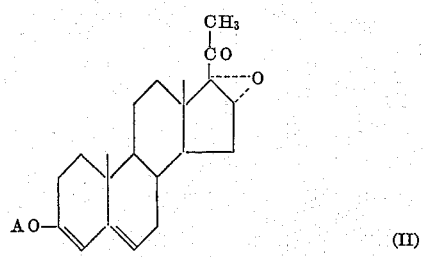

wherein A stands for a member selected from the group consisting of alkyl, substituted alkyl, aralkyl and substituted aralkyl radicals, with a basic compound of the Formula III $$HNRR' \qquad (III)$$

wherein NRR' has the same meaning as above, and trans- forming the obtained 3-alkoxy-16-(disubstituted amino)-17α-hydroxy compound of the Formula IV:

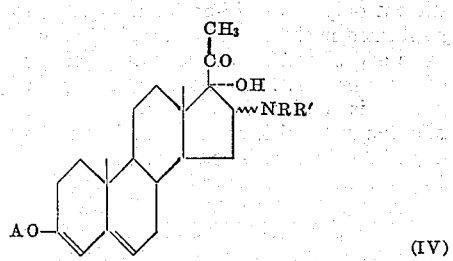

by hydrolysis into the corresponding 3-keto-16-(disubstituted amino)-17α-hydroxy-$\Delta^4$ compound of the Formula I.

This process can be carried out by reacting a 3-alkoxy-16,17-oxido-$\Delta^{3,5}$-pregnadiene-20-one in the presence or absence of a diluent, preferably at elevated temperature, with the nitrogen containing base corresponding to the desired end product. Diluents may be chosen among organic solvents proving to be inert against the reaction components, such as lower alkanoles, dioxane etc. It is advantageous to use an excess of the base used as reaction component. In case of reaction components or diluents having a low boiling point the reaction can be carried out in a closed vessel. Owing to the fact that the 16,17-oxido ring proves to be rather resistant against bases, the reaction can be advantageously carried out in the presence of substances having an accelerating effect on the reaction. According to our experience phenol or water may be advantageously used as such substances, for in their presence the splitting of the epoxyde ring and the simultaneous addition of the base occurs already at lower temperatures and within shorter time.

As basic compounds of the Formula III can be used for instance a dialkyl amine, such as dimethyl amine or diethyl amine, further heterocyclic amines, as morpholine, piperidine, piperazine or pyrrolidine.

The 3-enol-ether derivatives of the Formula II obtained by the reaction described above are then subjected to hydrolysis in a known manner, in the presence of an acid, then the ether group in position 3 is split off and the corresponding 3-keto-$\Delta^4$-steroid of Formula I, having in the D-ring a hydroxyl and a basic substituent is obtained. In the case of an acid hydrolysis the product is obtained in the form of the corresponding acid addition salt which can be transformed by alkaline treatment into a free base.

The compounds according to Formula II, used as starting materials, that is the 3-enol-ethers of the 16,17-oxido-$\Delta^4$-pregnene-3,20-dione have not been described in literature hitherto. These compounds can be prepared in a known manner, in the same way as the known enol-ethers of other 3-keto-$\Delta^4$-steroids. Thus for instance the ethyl-enol-ether is prepared by reacting the 16,17-oxido-$\Delta^4$-pregnene-3,20-dione with ortho formic acid ethylester (see Example 1).

The compounds of the Formula I can further be prepared by hydrolysing the 3-enamines-$\Delta^{3,5}$-steroid compounds of the Formula V

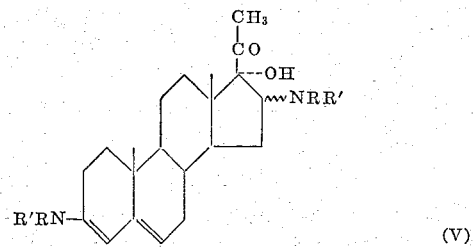

wherein NRR' has the same meaning as above, to give the corresponding 3-keto-compound having the basic substituent only in the 16-position. The hydrolysis may be performed in the usual manner, by boiling the compound to be hydrolyzed with aqueous alcohol or in the presence of acids or bases. In the case of an acid hydrolysis the product is obtained in the form of the corresponding acid addition salt which can be transformed by alkaline treatment into the free base. The exact configuration of the 16-substituent of the product obtained by the above procedure could not yet be established.

The 3-enamino-$\Delta^{3,5}$-steroid compounds of the Formula V, used as starting materials and the method of their preparation are described in our co-pending application Serial No. 218,464 filed August 21, 1962, now U.S. Patent 3,125,570.

The following examples illustrate the invention.

EXAMPLE 1

*3-Ethoxy-16α,17α-Oxido-$\Delta^{3,5}$-Pregnadiene-20-One*

20 g. of 16,17-oxido-progesterone are dissolved in 80 ml. benzene; 14 ml. ortho formic acid ethyl ester, 11 ml. abs. ethanol and as catalyst 0.8 g. of a 20 percent of abs. ethanolic hydrochloric acid solution are added. The mixture is boiled for 2 hours under reflux. After cooling the mixture is made alkaline, poured into 150 ml. water and the benzene phase is separated. The benzene solution is washed with water, dried and evaporated. The residue is recrystallized from abs. ethanol to which a few drops of pyridine were added previously. The 3-ethoxy-16α,17α-oxido-$\Delta^{3,5}$-pregnadiene-20-one so obtained melts at 142–149° C.; $[\alpha]_D = -39.7°$ (c.=1, chloroform).

EXAMPLE 2

*16-N-Morpholino-17α-Hydroxy-Progesterone*

A mixture of 3.5 g. of 16,17-oxido-progesterone-3-enol-ether, 0.9 g. of phenol and 10 ml. of morpholine are heated for 16 hours with stirring at a temperature of 135–140° C. After cooling the product separates in crystals. The separated crystals are suspended in 20 ml. methanol, sucked off, dried and recrystallized from ethanol. The 3-ethoxy-$\Delta^{3,5}$-pregnadiene-16-N-morpholino-17α-ol-20-one melts at 195–199° C.; $[\alpha]_D = -149.8°$ (c.=1, chloroform).

A mixture of 2 g. 3-ethoxy-$\Delta^{3,5}$-pregnadiene-16-N-morpholino-17α-ol-20-one, 50 ml. ethanol and 50 ml. aqueous 2 N hydrochloric acid is boiled for 1 hour under reflux. After cooling the mixture is made alkaline and hereafter shaken out three times with benzene. The united benzene solution is washed with water until neutral and evaporated to dryness. The residue is triturated with ethyl-acetate, sucked off and dried. The so obtained crystalline 3 - ethoxy-$\Delta^{3,5}$-pregnadiene-16-N-morpholino-17α-ol-20-one melts at 187–190° C.; $[\alpha]_D = +47.3°$ (c.=1, chloroform).

EXAMPLE 3

*16-N-Pyrrolidino-17α-Hydroxy-Progesterone*

A mixture of 3.5 g. 16,17-oxido-progesterone-3-enol-ether, 0.9 g. phenol and 10 ml. pyrrolidine is heated in a sealed tube for 16 hours. The product is cooled, suspended in 25 ml. methanol and sucked off. The 3-ethoxy - $\Delta^{3,5}$-pregnadiene-16-N-pyrrolidino-17α-ol-20-one, recrystallized from ethyl-acetate, melts at 216–221° C.; $[\alpha]_D = -152°$ (c.=1, chloroform).

A mixture of 2 g. 3-ethoxy-$\Delta^{3,5}$-pregnadiene-16-N-pyrrolidino-17α-ol-20-one, 50 ml. ethanol and 50 ml. aqueous 2 N hydrochloric acid is boiled for 1 hour under reflux. After cooling the mixture is made alkaline and hereafter shaken out three times with benzene. The united benzene solution is washed with water until neutral and evaporated to dryness. The residue is triturated with ethyl acetate, sucked off and dried. The so obtained crystalline 16 - N - pyrrolidino-17α-hydroxy-progesterone melts at 162–165° C.; $[\alpha]_D = +59.5°$ (c.=1, chloroform).

EXAMPLE 4

*16-N-Piperidino-17α-Hydroxy-Progesterone*

A mixture of 3.5 g. of 16,17-oxido-progesterone-3-enol-ether, 0.9 g. phenol and 10 ml. piperidine is heated in a sealed tube for 16 hours at a temperature of 135–140° C. After cooling 25 ml. methanol is added to the obtained brown oil. After stirring for a short time the solid product separates, it is sucked off, washed with methanol, dried and recrystallized from ethyl-acetate. The 3-ethoxy-$\Delta^{3,5}$-pregnadiene-16-N-piperidino-17α-ol-20-one so obtained melts at 158–163° C.; $[\alpha]_D = -131°$ (c.=1, chloroform).

A mixture of 2 g. 3-ethoxy-$\Delta^{3,5}$-pregnadiene-16-N-piperidino-17α-ol-20-one, 50 ml. ethanol and 50 ml. aqueous 2 N hydrochloric acid is boiled for 1 hour under reflux. After cooling the mixture is made alkaline and hereafter shaken out three times with benzene. The united benzene solution is washed with water until neutral and evaporated to dryness. The residue is triturated with ethyl-acetate, sucked off and dried. The so obtained crystalline 16 - N-piperidino-17α-hydroxy-progesterone melts at 157–161°; $[\alpha]_D = +25°$ (c.=1, chloroform).

EXAMPLE 5

*16-Morpholino-17α-Hydroxy-Progesterone*

10 g. 3,16-di-(N-morpholino)-3,5-pregnadiene-17α-ol-20-one are dissolved in 200 ml. methanol; 30 g. sodium acetate, 30 ml. water and 20 ml. glacial acetic acid are added; the reaction mixture is boiled for 4 hours with stirring. Hereafter it is cooled, filtered and finally made alkaline under ice cooling with a 10 percent sodium hydroxide solution. The separated product is sucked off, washed thoroughly with water, dried and recrystallized from ethyl acetate. The product so obtained melts at 187–190° C.; $[\alpha]_D = +25°$ (c.=1, chloroform).

The 3,16-di-(N-morpholino) - 3,5 - pregnadiene-17α-ol-20-one, used as starting material in this example and the method of its production are described in our co-pending application Serial No. 218,464 mentioned above.

In an analogous way can be obtained from the 3,16-di-(N-dimethylamino)-3,5-pregnadiene-17α-ol-20-one, the 16-dimethylamino-17α-hydroxy-progesterone (M.P. 129–133° C.; $[\alpha]_D = +63.4°$, c.=1, ethanol); from the 3,16-di-(N-piperidino)-3,5-pregnadiene-17α-ol-20-one the 16-N-piperidino-17α-hydroxy-progesterone (M.P. 157–161° C.; $[\alpha]_D = +25°$, c.=1, chloroform) and from the 3,16-di-(N-piperidino)-3,5-pregnadiene-17α-ol-20-one the 16-N-piperidino-17α-hydroxy-progesterone (M.P. 162–165° C.; $[\alpha]_D = +59.5°$, c.=1, chloroform). All these starting materials and the methods of their production are described in our co-pending application Serial No. 218,468 mentioned above.

EXAMPLE 6

A mixture of 3.5 g. 16,17-oxido-progesterone-3-enol-ether (prepared as described in Example 1), 0.9 g. phenol and 10 g. piperazine is heated in a sealed tube for 16 hours at 160°. The produce is then cooled, suspended in 25 ml. methanol and sucked off. The 3-ethoxy-$\Delta^{3,5}$- pregnadiene-16-N-piperazino-17α-ol-20-one, recrystallized from ethyl acetate melts at 230–237°.

*Analysis.*—N calculated 6.33%. N found 6.67%.

This product can be hydrolyzed in the same manner as described in the previous examples to give 16-piperazino-17-hydroxy-progesterone.

What we claim is:
1. A steroid derivative of the formula

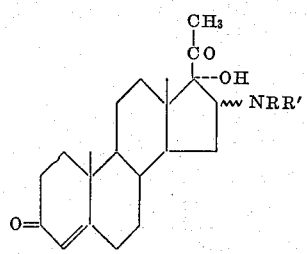

wherein NRR' represents a member selected from the group consisting of di-(lower alkyl)-amino, piperidino, piperazino, pyrrolidino and morpholino.
2. 16-morpholino-17α-hydroxy-progesterone.
3. 16-dimethylamino-17α-hydroxy-progesterone.
4. 16-piperidino-17α-hydroxy-progesterone.
5. 16-pyrrolidino-17α-hydroxy-progesterone.

References Cited by the Examiner
UNITED STATES PATENTS
3,125,570   3/64   Vargha et al. _____ 260—239.5

OTHER REFERENCES

Diassi et al.: J.A.C.S. 83 p. 4249–56 (1961).
Small et al.: Jour. Med. and Phar. Chem., vol. 5, pp. 962–975 (1962).

LEWIS GOTTS, *Primary Examiner.*